US008611856B2

(12) United States Patent
Yan et al.

(10) Patent No.: US 8,611,856 B2
(45) Date of Patent: Dec. 17, 2013

(54) IDENTIFYING SPURIOUS REQUESTS FOR INFORMATION

(75) Inventors: Weipeng Yan, Redwood City, CA (US); Kentaro Tokusei, Los Altos, CA (US)

(73) Assignee: Google Inc., Mountain View, CA (US)

( * ) Notice: Subject to any disclaimer, the term of this patent is extended or adjusted under 35 U.S.C. 154(b) by 930 days.

(21) Appl. No.: 11/253,004

(22) Filed: Oct. 18, 2005

(65) Prior Publication Data
US 2007/0084915 A1    Apr. 19, 2007

(51) Int. Cl.
H04W 12/12    (2009.01)
(52) U.S. Cl.
USPC .............. 455/410; 455/406; 235/381; 705/14
(58) Field of Classification Search
USPC ........................................................ 455/406
See application file for complete search history.

(56) References Cited

U.S. PATENT DOCUMENTS

| | | | | |
|---|---|---|---|---|
| 5,794,210 A | * | 8/1998 | Goldhaber et al. ............. | 705/14 |
| 5,937,391 A | * | 8/1999 | Ikeda et al. ..................... | 705/14 |
| 6,091,956 A | * | 7/2000 | Hollenberg ............... | 455/456.5 |
| 6,663,002 B2 | * | 12/2003 | Glaser ......................... | 705/36 R |
| 6,802,415 B2 | | 10/2004 | Loeffler | |
| 6,859,791 B1 | | 2/2005 | Spagna et al. | |
| 7,451,401 B2 | * | 11/2008 | Tanskanen et al. ........... | 715/744 |
| 7,451,477 B2 | * | 11/2008 | Griffin et al. ..................... | 726/1 |
| 7,483,871 B2 | * | 1/2009 | Herz ................................. | 707/2 |
| 7,483,893 B2 | * | 1/2009 | McVeigh et al. .................. | 707/5 |
| 7,499,874 B2 | * | 3/2009 | Singh et al. ..................... | 705/14 |
| 7,552,190 B1 | * | 6/2009 | Freishtat et al. ............... | 709/217 |
| 7,552,458 B1 | * | 6/2009 | Finseth et al. .................. | 725/34 |
| 2002/0016750 A1 | * | 2/2002 | Attia ............................... | 705/26 |
| 2002/0104090 A1 | * | 8/2002 | Stettner ............................ | 725/60 |
| 2002/0184161 A1 | | 12/2002 | Chang | |
| 2003/0014327 A1 | * | 1/2003 | Skantze ........................... | 705/26 |
| 2003/0032409 A1 | | 2/2003 | Hutcheson et al. | |
| 2003/0116453 A1 | | 6/2003 | Russo et al. | |
| 2003/0119485 A1 | * | 6/2003 | Ogasawara .................... | 455/411 |
| 2004/0093327 A1 | | 5/2004 | Anderson et al. | |

(Continued)

FOREIGN PATENT DOCUMENTS

EP        1 564 667        8/2005
WO        01/52131        7/2001

OTHER PUBLICATIONS

International Preliminary Report on Patentability for Application No. PCT/US2006/040933, dated Mar. 12, 2009, 7 pages.
International Search Report & Written Opinion, PCT/US 06/40933, mailed Aug. 8, 2008, 11 pages.

(Continued)

*Primary Examiner* — Lester Kincaid
*Assistant Examiner* — Diego Herrera
(74) *Attorney, Agent, or Firm* — Fish & Richardson P.C.

(57) ABSTRACT

A computer-implemented method of identifying illegitimate requests for information may include associating a first carrier with an electronic promotional item, receiving a request relating to the electronic promotional item from a second carrier, and identifying the request as illegitimate if the first carrier is different than the second carrier. The computer-implemented method may further include transmitting the electronic promotional item to the first carrier. The request may be a response to the electronic promotional item. In some embodiments, the electronic promotional item may be a link to more information about the electronic promotional item. The computer-implemented method may further include logging the request in a database and charging an ad sponsor for the request in the second database. In some embodiments, a charge may be canceled for the request if the request is identified as illegitimate.

20 Claims, 8 Drawing Sheets

(56) References Cited

U.S. PATENT DOCUMENTS

| | | | |
|---|---|---|---|
| 2004/0117302 A1* | 6/2004 | Weichert et al. | 705/40 |
| 2004/0137929 A1* | 7/2004 | Jones et al. | 455/517 |
| 2004/0139013 A1* | 7/2004 | Barbier et al. | 705/40 |
| 2004/0153365 A1 | 8/2004 | Schneider et al. | |
| 2004/0158492 A1* | 8/2004 | Lopez et al. | 705/14 |
| 2004/0249712 A1* | 12/2004 | Brown et al. | 705/14 |
| 2005/0004840 A1* | 1/2005 | Wanninger | 705/14 |
| 2005/0033684 A1* | 2/2005 | Benedyk et al. | 705/39 |
| 2005/0075932 A1* | 4/2005 | Mankoff | 705/14 |
| 2005/0086378 A1* | 4/2005 | Murthy et al. | 709/245 |
| 2005/0108551 A1 | 5/2005 | Toomey | |
| 2006/0015402 A1* | 1/2006 | Graves et al. | 705/14 |
| 2006/0258397 A1* | 11/2006 | Kaplan et al. | 455/556.1 |
| 2006/0259361 A1* | 11/2006 | Barhydt et al. | 705/14 |
| 2006/0265284 A1* | 11/2006 | Moodie et al. | 705/14 |
| 2007/0022442 A1* | 1/2007 | Gil et al. | 725/62 |

OTHER PUBLICATIONS

Examiners Report for AU application No. 2006346031, dated Jun. 14, 2011, 2 pages.

European Search Report & Written Opinion for Application No. EP 06851451.2-1238, dated Apr. 8, 2011, 10 pages.

Johnston, Paul. "Authentication and Session Management on the Web." Giac Security Essentials Certification Practical Assignment Version 1.4b; Nov. 28, 2004. (31 pages).

Prosise, Jeff. "Wicket Code: Foiling Session Hijacking Attempts." MSDN Magazine, Aug. 2004. Retrieved from the Internet <URL: http://msdn.microsoft.com/en-us/magazine/cc300500.aspx> (4 pages).

European Official Action for Application No. EP 06 851 451.2-1238, dated Jul. 31, 2012, 7 pages.

JP Official Action in JP App. No. 2008-536808, mailed Aug. 15, 2012, 5 pages.

* cited by examiner

IDENTIFYING SPURIOUS REQUESTS FOR INFORMATION

TECHNICAL FIELD

This disclosure relates to filtering spurious requests for information.

BACKGROUND

Various entities may pay voice and data service providers to deliver electronic promotional material to users. Electronic promotional material may include, for example, product advertisements, coupons or discounts, announcements, or opportunities to purchase products or services. Electronic promotional material may be delivered in various formats, for example, as text, images, audio content, or combinations of these formats or other formats. The electronic promotional material may solicit a response from the recipient. For example, an advertisement may provide a link that a user can select to receive additional information, to make a purchase, to place a call, to register on a list, or to commit to some future activity.

Electronic promotional material may be delivered to users in various ways. In some embodiments, an information provider may deliver electronic promotional material to users who submit search queries related to the promotional material. For example, a user who submits a query to Google™ for restaurants serving a specific cuisine in a specific location may receive in response an electronic coupon for a particular restaurant serving that cuisine in that location. In some embodiments, electronic promotional material may be delivered to users of a specific mobile device carrier or a specific mobile device. For example, a company may send promotional material to current subscribers of Verizon's wireless network, or current users of a Moto RAZR™ mobile phone.

Various aspects of the delivery and effectiveness of electronic promotional material may be tracked. For example, an information provider may track how many instances of a particular electronic promotional item are delivered to users (a number of "impressions"). An information provider may additionally track how many responses are received from promotional material that solicit user responses. For example, the information provider may track a number "click-throughs" associated with an ad that provides a user with a redirect link to select in order to receive more information. In some embodiments, this information may be used to bill a sponsor of the electronic promotional material. For example, a sponsor may be billed based on a number of impressions, or a number of click-throughs, or an average click-through rate. In some embodiments, the information may also affect parameters related to future delivery of the electronic promotional material. For example, an information provider may dynamically select between a number of different candidate ads that are responsive to a user search query to identify an ad to deliver. The candidate ads may be selected based on content, or target audience, or in some embodiments, based on past performance of the ad. More particularly, an ad with a high number of impressions but a low click-through rate may not be delivered as frequently as an ad with a similar number of impressions but a higher click-through rate.

SUMMARY

In general, this document relates to methods and systems for filtering spurious requests for information. In some embodiments, the methods and systems may be used to identify spurious responses to electronic promotional items, such as, for example, advertisements, that were previously delivered to mobile devices. Because responses to ads may affect an amount the ad's sponsor is billed, or parameters related to future delivery of the ad, hackers or unscrupulous competitors may generate spurious responses to ads in order to, for example, drive up the cost of the ad. As another example, hackers or unscrupulous competitors may submit queries or take other actions in order to receive large numbers of ads in order to artificially lower click-through rates. The methods and systems described in this document may filter out such spurious requests.

In a first general aspect, a computer-implemented method of identifying illegitimate requests for information may include associating a first carrier with an electronic promotional item, receiving a request relating to the electronic promotional item from a second carrier, and identifying the request as illegitimate if the first carrier is different than the second carrier.

In some embodiments, the computer-implemented method may further include transmitting the electronic promotional item to the first carrier. The request may be a response to the electronic promotional item. Associating the first carrier with an electronic promotional item may include storing a list of Internet Protocol (IP) addresses associated with the first carrier in a first database. The second carrier may be identified by an IP address corresponding to the request. In some embodiments, the electronic promotional item may be a click-to-call link, a redirect link, or a link to more information about the electronic promotional item.

In some embodiments, the computer-implemented method may further include logging the request in a second database. The computer-implemented method may further include charging an ad sponsor for the request in the second database. In some embodiments, a charge may be prevented for the request if the request is identified as illegitimate.

In a second general aspect, a system for identifying spurious requests for information may include an interface and a response filter. The interface may receive digital responses to promotional items from users, and the responses may include identifying information for carriers that transmit the responses to the interface. The response filter may compare identifying information for a carrier to which the promotional item was sent, with the identifying information for a carrier from which the response was received to determine whether the response is spurious.

In some embodiments, the interface may include an Internet Web server. In some embodiments, the system may further include a response log, wherein the response filter acts on entries in the response log relating to a plurality of digital responses to promotional items. The system may also include a promotional item server to select promotional items for delivery to users associated with particular carriers and to provide carrier identifying information with the promotional items. The system may also include a search engine that receives search requests from the users associated with the particular carriers, and the promotional item server may further select promotional items for delivery to the users based on content of the search requests.

In some embodiments, the carrier identifying information may include an Internet Protocol (IP) address. The digital responses may further include identifying information for a corresponding promotional item. The system may further include a billing system that charges a sponsor of a promotional item for responses to the promotional item that are not identified as spurious.

In a third general aspect, a system for identifying illegitimate requests for information may include an interface that receives digital responses to promotional items from users. The responses may include identifying information for carriers that carry the responses. The system further includes means for determining responses to be illegitimate if carrier identifying information associated with the responses does not match carrier identifying information associated with the promotional items.

In some embodiments, the system may further include a promotional item server that selects promotional items for delivery to users associated with the carriers and to provide carrier identifying information with the promotional items. The system may further include a billing system that charges a sponsor of a promotional item for responses to the promotional item that are not identified as spurious.

Advantages of the systems and methods described in this document may include any or all of the following. Sponsors of electronic promotional material may be protected against paying for spurious requests for promotional material or spurious responses to such material. The integrity of statistics related to ad delivery or ad response rates may be protected. The ability of an information provider or a voice or data service provider to attract sponsors of electronic promotional material may be enhanced. In addition, a user of a system may benefit by being provided with relevant content.

The general and specific aspects may be implemented using a system, a method, or a computer program, or any combination of systems, methods, and computer programs. The details of one or more embodiments are set forth in the accompanying drawings and the description below. Other features, objects, and advantages will be apparent from the description and drawings, and from the claims.

DESCRIPTION OF DRAWINGS

These and other aspects will now be described in detail with reference to the following figures.

Like reference symbols in the various drawings indicate like elements.

DETAILED DESCRIPTION OF EXEMPLARY EMBODIMENTS

Figure 1:
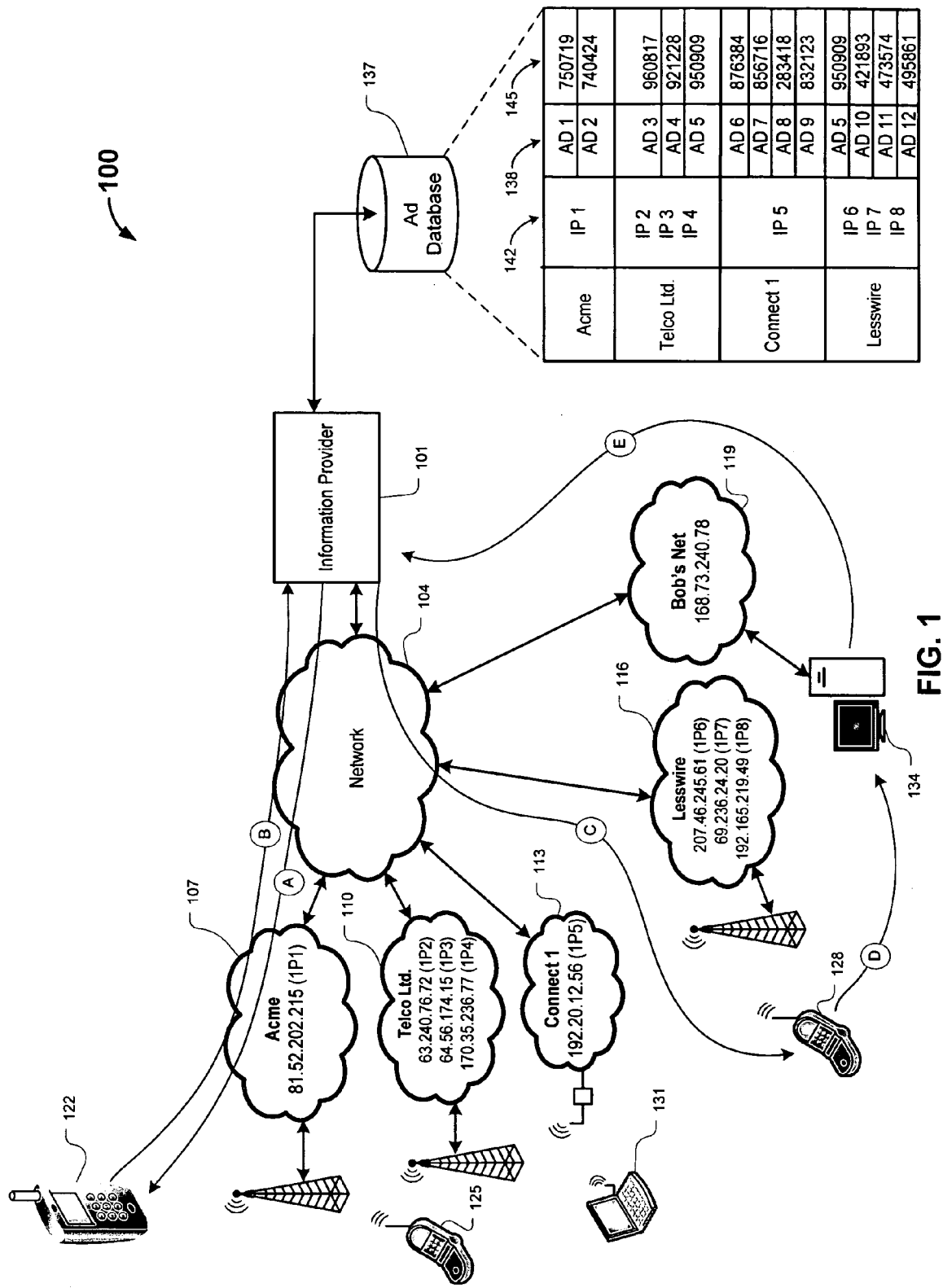
FIG. 1 is a block diagram of an exemplary environment in which spurious responses for information may be filtered, according to some embodiments.

FIG. 1 is a block diagram of an exemplary environment 100 in which spurious requests for information may be filtered. Within the exemplary environment 100, various devices may receive various services, such as, for example, voice and data services from various networks. In addition, along with the various services, the devices may receive and respond to electronic promotional material, such as, for example, advertisements (ads). In some embodiments, the ads may be provided to users of specific carriers or networks. In some embodiments, sponsors of the ads may be charged for delivery of the ads based on a number of instances of the ad actually being delivered (a number of "impressions") or based on a "click-through rate," or rate at which users respond to the ad. In some embodiments, a response to an ad may be spurious or illegitimate. For example, an unscrupulous competitor may fraudulently respond to a sponsor's ad solely to drive up the cost of the ad to ad sponsor. The systems and methods described in this document may filter out such spurious requests and mitigate their effect.

As shown, the exemplary environment 100 includes an exemplary information provider 101 that may provide, for example, data services to users and may further deliver ads to users. The information provider 101 may provide the data services and ads to users through a central network 104, such as, for example, the Internet, and through a plurality of other networks connected to the central network 104. As shown, the other networks include, for example, mobile device networks 107, 110, 113 and 116; and wired networks, such as the network 119. The other networks may provide their own services to their subscribers, or they may relay services originating on other networks. A mobile device network may include, for example, a cellular network 107, 110, or 116 that provides voice and data services to subscribers. As another example, a mobile device network may include a Wi-Fi Hotspot 113, or portion of a local or regional data network (e.g., a WiMAX Network or wireless metropolitan area network). Each network may have associated with it one or more Internet Protocol (IP) addresses. For example, as shown, the network 110 is associated with IP addresses IP2, IP3 and IP4; the network 113 has IP address IP5; and so on.

Various devices may access the services provided by the above-described networks. For example, a wireless personal digital assistant (wireless PDA) 122 may receive voice and data services from the network 107. A cellular telephone 125 or smartphone 128 may access voice or data services from the networks 110 or 116, respectively. A mobile computing device 131 may access data services from the Wi-Fi Hotspot 113, and a computing device 134 may access various services from the wired network 119. These devices and networks are merely exemplary; users may employ various other networks or devices to receive various services.

In some embodiments, the information provider 101 may include an ad database 137 that stores ads 138 or other electronic promotional material for delivery to various devices. In some embodiments, ads may be targeted to users or subscribers of specific networks or carriers. For example, as shown in FIG. 1, Ad 1 and Ad 2 may be targeted to users or subscribers of the "Acme" network 107. The ad database 137 may also store a list 142 of valid IP addresses associated with the network or carrier. Moreover, the ad database 137 may store a list of identifiers 145, such as, for example, numeric identifiers corresponding to each ad. As shown, for example, the identifier "750719" corresponds to Ad 1. Ads may target more than one network or carrier. For example, as shown in the ad database 137, Ad 5 is directed to subscribers of both the "Telco Ltd." network 110 and the "Lesswire" network 116.

In a first exemplary scenario, the information provider 101 may select an ad for delivery to a device based on the network through which the devices accesses the information provider 101. More particularly, the information provider 101 may select Ad 1 for delivery to the wireless PDA 122. Ad 1 may be selected, for example, in response to a previous communication sent by the wireless PDA 122, such as, for example, a search query. As another example, Ad 1 may be selected and delivered to the wireless PDA 122 in response to other application input from the wireless PDA 122. For example, the wireless PDA 122 may run a location-based service application such as, for example, an application that periodically provides a user with information relevant to the user's current physical location. As another example, Ad 1 may be selected and delivered by the information provider 101 in an unsolicited manner. Regardless of how Ad 1 is selected and delivered, it may be delivered to the wireless PDA 122 via path A. The delivered ad may include an identifier associated with the ad (e.g., "750719"). Any responses to the ad may be sent from the wireless PDA 122 back to the information provider 101 via path B. The response may also include the ad identifier (ID). From a header associated with the ad response, the information provider 101 may be able to identify an IP address from which the response was received (e.g., 81.52.202.215 {IP 1}).

As will be described in more detail with reference to the other figures, the information provider 101 may log the response. In some embodiments, the information provider 101 may also analyze the response to determine if it is a spurious response. For example, upon receiving the response, the information provider 101 may access the ad database 137 to retrieve IP addresses associated with the ad identifier. The information provider may then compare the retrieved IP address(es) associated with the ad identifier to the IP address from which the ad response was received. If the IP address from which the ad was received is not a "legitimate" IP address associated with the ad identifier (e.g., the IP address from which the ad response was received does not match a retrieved IP address associated with the ad identifier), the ad response may be identified as spurious. In some embodiments, spurious responses may be removed from the ad log or processed differently than other ad responses. (E.g., ad sponsors may not be billed for the ad response, and the ad response may not be counted in any ad statistics.) In this first exemplary scenario, the IP address from which the ad response was received is associated with Ad 1, so the response may be considered "legitimate."

In a second exemplary scenario, the information provider 101 may select another ad, such as, Ad 5 ("950909"), for delivery to another device, for example, the smartphone 128. Again, Ad 5 may be selected in response to some input, such as a query from the user of the smartphone 128; or from application input; or Ad 5 may be selected for deliver without any input. As shown, Ad 5 is delivered to the smartphone 128 via path C. The user of the smartphone 128 may transfer Ad 5 to another device, such as, for example, the computing device 134 (e.g., via path D). The user may transfer Ad 5, for example, in order to fraudulently transmit responses to Ad 5 using a program running on the computing device 134. More particular, the user may run a program that automatically submits hundreds or thousands of responses to Ad 5 in order to, for example, artificially increase costs to the Ad 5 sponsor. In this second exemplary scenario, because the Ad 5 responses are sent from the computing device 134, they may be associated with IP address 168.73.240.78.

Upon receipt of Ad 5 responses from the computing device 134, the information provider 101 may analyze them and determine that they are spurious responses. More particularly, the information provider 101 may query the ad database 137 using an identifier associated with the ad response ("950909"). In response to the query, the ad database 137 may provide a list of legitimate IP addresses (e.g., IP 6, IP 7, and IP 8, corresponding to the carrier to which Ad 5 was originally directed, as well as IP 2, IP 3 and IP 4, corresponding to the network 110 to which Ad 5 may also be targeted). Because the IP address from which the Ad 5 responses are received (168.73.240.78) does not match any of the legitimate IP addresses from the ad database 137, the Ad 5 responses may be identified as spurious responses and processed accordingly.

Figure 2:
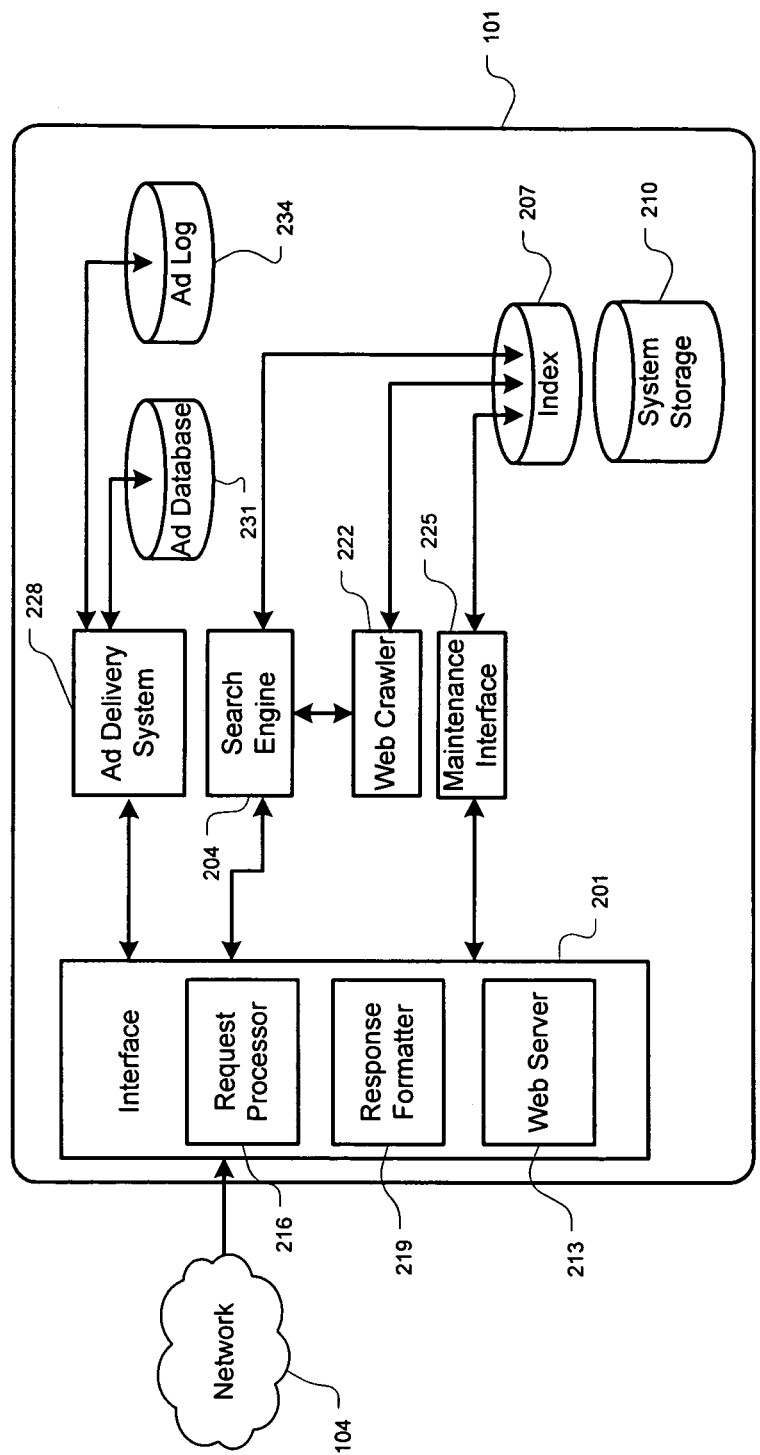
FIG. 2 is a block diagram showing additional details of the exemplary information provider, according to some embodiments.

FIG. 2 is a block diagram showing additional details of the exemplary information provider 101, according to some embodiments. As shown, the information provider 101 connects to the central network 104. More particularly, an interface 201 within the information provider 101 may connect to the network 104. Through the interface, users may access various services provided by the information provider 101. In some embodiments, the information provider 101 may include an Internet search engine 204. In some embodiments, the information provider 101 may provide information such as real-time traffic information, weather forecasts, news, or real-time stock quotes. The information may include text, graphics, animations, audio, video or other appropriate information.

The information provider 101 may also be connected to other networks (not shown), such as, for example, an internal company network or a local wireless communication network. The information provider 101 may be divided into separate systems to allow for scalability, data integrity, or data security, and it may be connected to the network 104 (e.g., the Internet) in any of a variety of ways, as is commonly known.

As shown, the exemplary information provider 101 includes an index database 207 and system storage 210. The index database 207 may contain data that represents information that the information provider 101 delivers to users. For example, if the information provider 101 comprises a typical Internet search engine 204, the index database 207 may contain links to information stored on the Internet (e.g., outside of the information provide 101). Some information referenced by entries in the index database 207 may be stored in the system storage 210. For example, the system storage 210 may "mirror" information for which search reports are regularly received—such as, for example, news stories, or images or weather information. The system storage 210 may also store various components needed for general operation of the information provider 101, such as, applications, system parameters, and information about users who access the system.

The index database 207 may or may not be cached. For example, the index database 207 may include a separate cached index database (not shown) to support faster access to search results. The index 207 and the system storage 210 may be local to the information provider 101, or it may be distributed, such as, for example, in an external server or storage farm (not shown). Within the information provider 101, the search engine 204 may operate to produce search results that include information stored in the index database 207 or the system storage 210, in response to search requests from users.

As shown, the information provider 101 communicates through an interface 201. The interface 201 may include one or more Web servers, such as the Web server 213, with which the information provider 101 may receive requests and transmits responses. The interface 201 may further include a request processor 216 and a response formatter 219, which may, in turn, be part of Web server 213. The information provider 101 may use the request processor 216, for example, to format requests received by the Web server 213. The request processor 216, for example, may parse requests, and, if necessary, reformat them (e.g., from HTML {hypertext markup language} or text format, to search terms or strings that are compatible with the search engine 204). The request processor 216 may operate in conjunction with the interface 201. In some embodiments, the request processor 216 may be part of the interface 201.

The interface 201 may include one or more distinct interfaces (not shown). For example, a first interface may receive requests, such as, for example, requests for information or search queries; a second interface may transmit results to requesting devices. These interfaces may comprise interface devices for a high-speed, high-bandwidth network such as SONET (synchronous optical networking), Infiniband, or ethernet, or any suitable communication hardware operating under an appropriate protocol such that the information provider 101 is able to respond to a large number of distinct requests simultaneously. The precise design of the interface 201, or of the overall information provider 101, is not critical to this disclosure and may take any suitable form.

Information in the index database 207 may be gathered by an automated information gatherer, such as, for example, a Web crawler 222 or a spider. The exemplary Web crawler 222 may, for example, continuously, or almost continuously, obtain new information from sources connected to the network 104 or to other networks. The Web crawler 222 may also retrieve content in response to a search query. This information may provided to the index database 207 or to the system storage 210, or to both.

In addition to being added to the index database 207 or system storage 210 in an automated fashion, information may also be manually loaded in or retrieved from the index database 207 or system storage 210 through a maintenance interface 225. For example, the maintenance interface 225 may allow an administrator of the information provider 101 to manually add bulk data to the index database 207 or to the system storage 210.

Responses to data requests may be formatted for delivery by the response formatter 219. The response formatter 219 may, for example, format content that is responsive to data requests in a format like HTML, XML (extensible markup language), WML (wireless markup language), or some other suitable format. The response formatter 219 may operate in conjunction with the interface 201. In some embodiments, the response formatter 219 may be included in the interface 201.

The information provider 101 may further include an ad delivery system 228, along with an ad database 231 and an ad log 234. The ad delivery system 228 may receive query requests and other input from the interface 201. In some embodiments, the ad delivery system 228 may select an ad from the ad database 231 to deliver in conjunction with other content, such as, for example, a response to the query. The selected ad may correspond to content of the search query. Referring to an earlier example, a user who submits a query for a local restaurant having a particular cuisine may receive, along with information about various restaurants having that cuisine in that location, a coupon for a particular restaurant. The ad delivery system 228 may select such an ad from the ad database 231 and may deliver it to the user along with responses to the user query. More particularly, the response formatter 219 may combine search results from the search engine 204 and ad result from the ad delivery system 228 into an overall response and may send that response to the user via the central network 104.

As described above, some ads may solicit a response from the recipient. For example, an ad may include a link that a user can select to receive additional information or to perform other actions. Any such responses may be directed back to the information provider 101 and subsequently logged. For example, the information provider 101 may receive, via the interface 201 and ad delivery system 228, a response to a previously delivered ad. The ad delivery system 228 may store this response in the ad log 234. This ad log 234 may be subsequently used to bill sponsors of such ads or to log various statistics related to ads and to their effectiveness. Processing of ads will now be discussed in further detail with reference to other figures.

Figure 3:
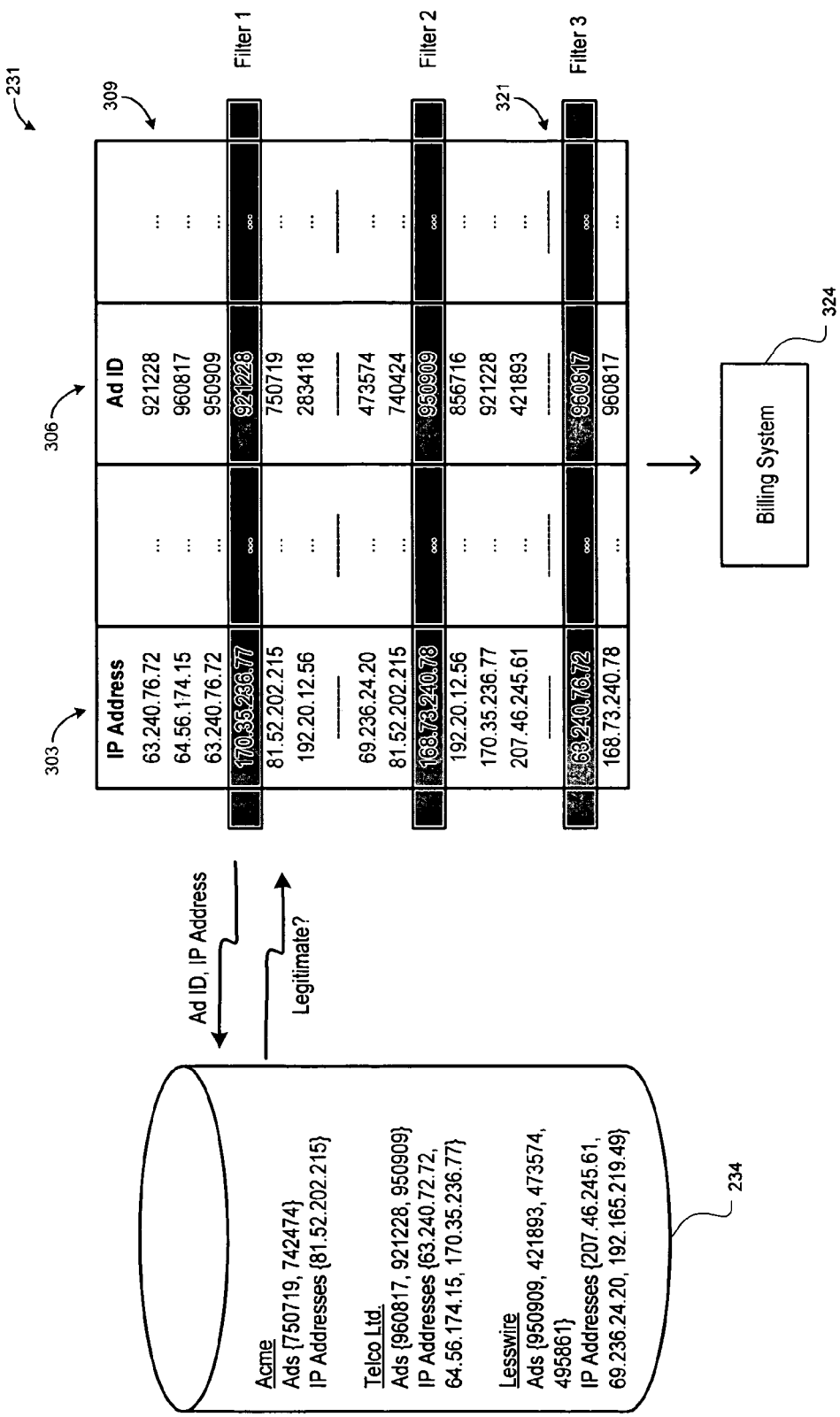
FIG. 3 is a diagram showing contents of an exemplary ad log, according to some embodiments.

FIG. 3 is a diagram showing contents of an exemplary ad log 231. As shown, the ad log 231 includes a number of entries, each of which includes an IP address 303 and an Ad ID 306. In some embodiments, the ad log 231 may be maintained by an ad delivery system, and the ad log 231 may be used to bill ad sponsors for delivery of ads or for responses to previously delivered ads. In some embodiments, the ad log 231 may also be used to track statistics about ad delivery or about effectiveness of various ads.

In some embodiments, an entry in the ad log 231 may correspond to an ad that was sent by an ad delivery system, such as, for example, the ad delivery system 228 that is shown in FIG. 2. In some embodiments, an entry in the ad log 231 may correspond to an ad response received from, for example, a mobile device. More particularly, the entry 309 may correspond to a response to Ad 4, which was previously sent to the cell phone 125, via the "Telco Ltd." Network 110.

The ad system may employ various filters to filter and analyze contents of the ad log 231. For example, the ad delivery system 228 may employ Filter 1, Filter 2 and Filter 3 to filter and analyze ad log 231 contents. Filter 2, for example, may filter contents of the ad log 231 to identify and process illegitimate or spurious ad responses. Other filters may perform other tasks.

To identify illegitimate ad responses in some embodiments, Filter 2 may compare an IP address associated with an ad response to one or more IP addresses to which a corresponding ad was originally targeted. To make this comparison, Filter 2 may query the ad database 234 for entries having a particular Ad ID, such as, for example, "950909." From this query, the ad delivery system 228 may determine, for example, that the ad with identifier "950909" was originally targeted to networks having IP addresses 63.240.76.72, 64.56.174.15, 170.35.236.77, 207.46.245.61, 69.236.24.20 or 192.165.219.49. If the ad response came from IP address 168.73.240.78, rather than from one of the originally targeted IP addresses, the ad delivery system 228 may identify the response as illegitimate. In some embodiments, the Filter 2 may remove illegitimate ad responses from the ad log 231 (e.g., see line 321). In some embodiments, Filter 2 may flag the entry in some manner that prevents the ad response from being billed to the ad's sponsor or from being counted in any ad statistics.

The ad log 231 may store information in addition to IP addresses and Ad IDs corresponding to ad responses. For example, in some embodiments, the ad log 231 may store information about ads that were actually delivered, and the IP Address to which they were delivered. In some embodiments, the ad log 231 may log other information associated with ad delivery's responses such as, for example a time or date stamp, or information about a device to which the ad was delivered or from which the ad was received. For example, the ad delivery system 228 may store cookies on a device to which an ad is sent or from which an ad response is received. Cookies may facilitate collection of other information from the device, such as browsing history, call history, purchase history or profile information. In some embodiments, cookies may only be used on devices that are configured to receive and store cookies.

After the ad log 231 is processed by one or more filters, the contents of ad log 231 may be copied to a billing system 324. As described above, the billing system may, in some embodiments, charge ad sponsors for delivery of ads or for receipt of ad responses. By applying a filter, such as Filter 2, to the contents of the ad log 231 before they are copied to the billing system 324, ad sponsors may be protected from paying for illegitimate ad responses.

Contents of the ad log 231 may be copied to or processed by other billing systems, or used in other ways. For example, the ad delivery system 228 may compile statistics on various ads. More particularly, in some embodiments, ads that receive a high number of responses may be subsequently delivered more than ads that receive relatively fewer responses.

Various filters may be applied to the contents of the ad log 231 at any time. As described above, the ad log 231 may be filtered after entries are captured, in a "post-processing" operation. In some embodiments, filters may be applied in real-time, before entries are written to the ad log 231. For example, in some embodiments, illegitimate ad responses may be identified and filtered in real-time, and never stored in the ad log 231; instead, they may be stored in another log or simply discarded.

Figure 4A:
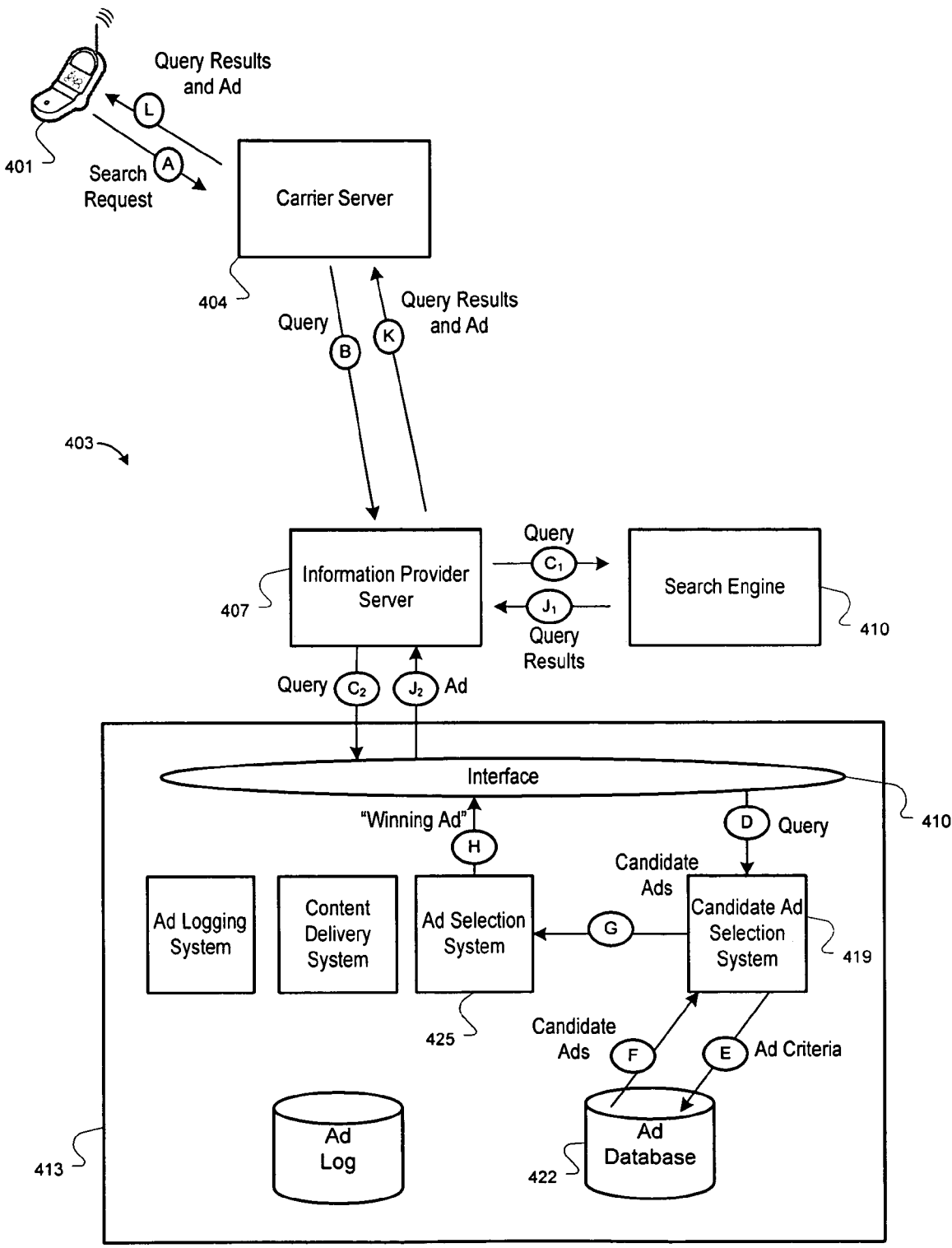
FIG. 4A is an exemplary flow diagram illustrating selection and delivery of an ad to a mobile device, according to some embodiments.

FIG. 4A is an exemplary flow diagram illustrating selection and delivery of an ad to a mobile device. As shown, a mobile device, such as, for example, a smartphone 401, may send a query to an information provider 403. In some embodiments, the information provider 403 may provide content such as news or other information (e.g., CNN.com). In some embodiments, the information provider 403 may provide other services, such as, for example, Internet search services (e.g., Google.com). The query may be entered by a user in, for example, a mobile browser application running on the smartphone 401. The query may be sent first, via path A, to a server 404 associated with, for example, a wireless carrier. More particularly, the query may be sent to a wireless carrier's network, via path A, in a signal that is formatted for radio transmission, such as, for example, a code-division multiple access (CDMA) signal. Path A may represent, for example, a wireless link between the smartphone 401 and the carrier's network, which may include various wireless towers and transceivers and network routing equipment (not shown). At the wireless carrier's server 404, the query may be converted to, for example, a hypertext transfer protocol (HTTP) format. The query may be sent to the information provider 403, via path B. More particularly, the query may be sent to a Web server 407 associated with the information provider 403. Path B may represent, for example, a routing path over the Internet.

Once the query is received by the information provider server 407, it may be further processed. In one exemplary scenario, for example, the information provider 403 may be Google™, and the query may be a search request. The query may be sent to a search engine 410 within the information provider 403, via path $C_1$, and query results may be provided by the search engine 410 via path $J_1$. Paths $C_1$ and $J_1$ may represent, for example, internal routing paths within the information provider 403. In some embodiments, the query may also be provided to an ad delivery system 413, via path $C_2$.

The ad delivery system 413 may analyze the query to determine its content, and it may select an ad corresponding to the content for delivery to the device from which the query was received. For example, an interface and a candidate ad selection system 419 may receive a query via paths $C_2$ and D and may determine content of the query. Based on the content, the candidate ad selection system 419 may identify ad criteria and query an ad database 422 with this criteria, via path E.

In some embodiments, the ad database 422 may return a number of candidate ads that may relate to content of the query. For example, if the query was for "restaurants in Mountain View," the ad database 422 may return a number of ads for restaurants in Mountain View, Calif. In some embodiments, one or more of the candidate ads may be selected for delivery to the smartphone 401. For example, the candidate ads may be sent to an ad selection system 425 via path G, that selects one or more ads for delivery.

To select an ad for delivery, the ad selection system 425 may compare various parameters associated with each candidate ad. For example, each ad may be associated with a maximum or average cost value set by the ad's sponsor. The cost value may correspond to a charge that the ad's sponsor may incur each time the ad is delivered or each time a response is received from the ad. In some embodiments, such a charge may be a "cost-per-click" charge associated with Google's AdWords™ or AdSense™ with a similar system. Other parameters may factor into how an ad is selected from candidate ads for delivery to a device. For example, an ad's past performance may affect its future selection for delivery. More particularly, an ad that frequently receives a response may be selected over an ad that rarely receives a response, when other parameters are equal (e.g., "cost-per-click" parameters).

Once an ad is selected for delivery, the "winning ad" may be formatted with other content and delivered to the appropriate device. For example, the ad selection system 425 may route a winning ad to the information provider server 407 via paths H and $J_2$. (Paths $C_2$, $J_2$, D, E, F, G and H may represent internal routing paths within the information provider 403; these paths may connect various components that are local to a single location, or the components may be distributed and separated over a large geographical area.) At the information provider server 407, a winning ad and query results may be combined and formatted for delivery to the device or system from which the query was received. For example, in some embodiments, the information provider server 407 may bundle the ad and query results in an HTML message or a WML message and send it to the carrier server 404 via path K. Path K may represent, for example, a routing path over the Internet. The bundled ad and query results may be first sent to the carrier server 404, where they may be converted to a radio signal (e.g., CDMA) for transmission to the smartphone 401, via path L.

Figure 4B:
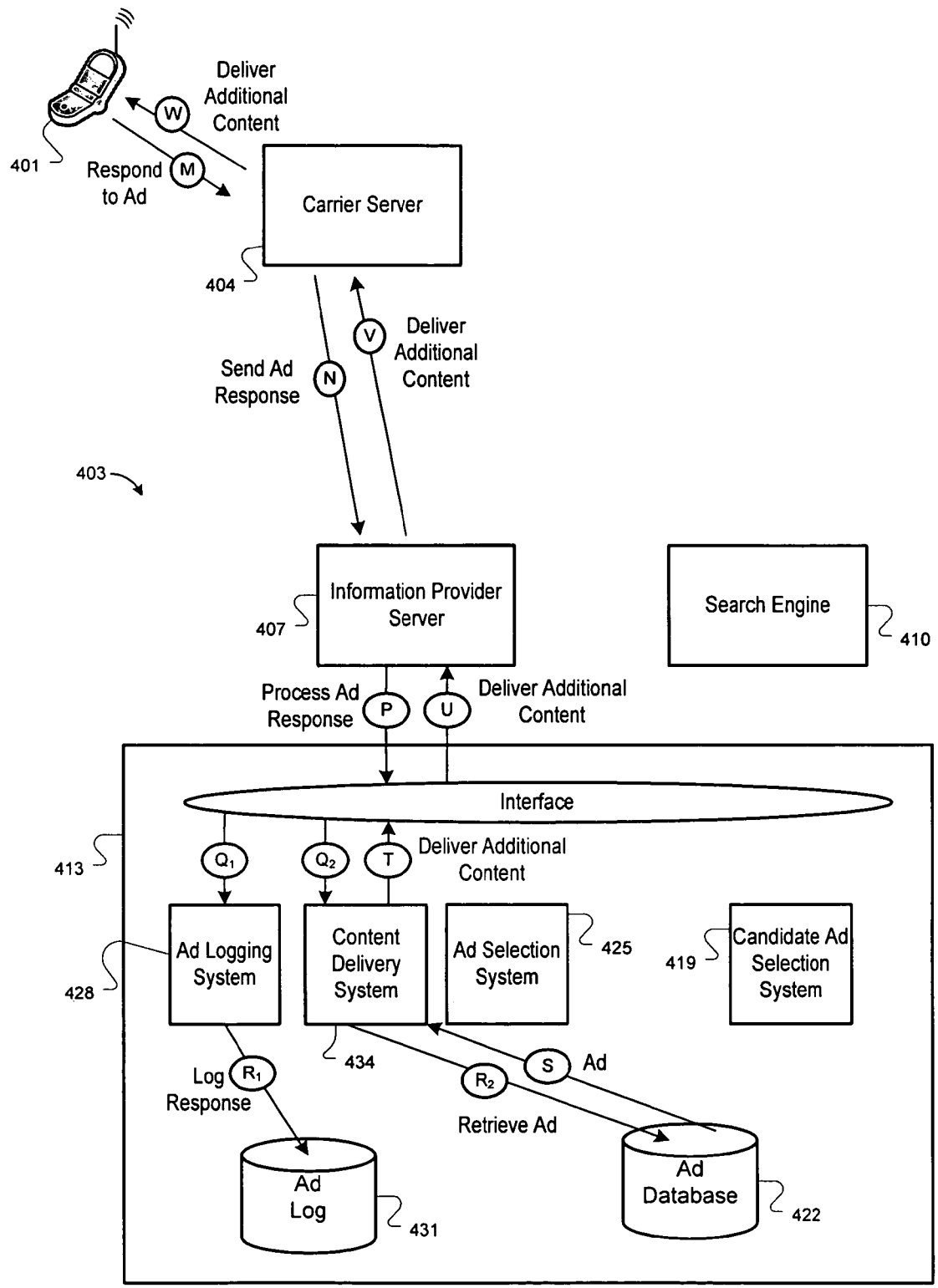
FIG. 4B is an exemplary flow diagram illustrating receipt of a response to an ad that was delivered to a mobile device, according to some embodiments.

FIG. 4B is an exemplary flow diagram illustrating receipt of a response to an ad that was delivered to a mobile device as described with respect to FIG. 4A. The delivered ad may be displayed on the smartphone 401, for example, within a mobile browser running the smartphone 401. The delivered ad may solicit a response from a user. For example, the ad may include a link that the user can select to receive more information, or to be redirected to another Web site, or to make a purchase or to take some other action.

In one exemplary scenario, the ad may include an embedded link to the ad sponsor's Web site. In some embodiments, the link may be encrypted or encoded in a manner that causes a user selection to be initially sent back to the information provider 403. Selection of the link may cause an ad response to be sent to the carrier server 404 via path M. As described above, path M may be a CDMA radio link. The carrier server 404 may convert the ad response to another format (e.g., HTTP) and send it on to the information provider 407 via path N. The information provider 407 may route the ad response to its ad delivery system 413 (e.g., via internal path P).

The ad delivery system 413 may log the ad response, for example, with an ad logging system 428 and an ad log 431 (e.g., via paths $Q_1$, R). In some embodiments, the ad delivery system 413 may also provide additional content. For example, in a scenario where the original ad included an encrypted or encoded embedded link to the ad sponsor's Web site, the ad delivery system may return an unencrypted or unencoded link back to the mobile device (e.g., via paths $Q_2$. T, U, V, and W). Such an unencrypted or unencoded link may allow a mobile browser in the smartphone 401 to redirect to the ad sponsor's Web site. In such a scenario, the encrypted or encoded link may be decrypted or unencoded by a content delivery system 434. In another scenario, the ad delivery system may return additional content, such as, for example, information about the ad sponsor or actual promotional material such as a coupon or electronic discount or credit validation. In some embodiments, such additional content may be retrieved from the ad database 422 (e.g., via path $R_2$ and S) and returned to the smartphone 401 (e.g., via paths T, U, V and W).

Ads or other electronic promotional material may be logged in other ways as well. For example, an ad may include an unencrypted or unencoded link to the ad sponsor's Web site that allows a mobile device to immediately redirect. The user's selection of the redirect link may also cause the mobile device to request some bit of active content from the information provider 403 that allows the information provider 403 to log the response. For example, the redirect link may cause the mobile device to request a .gif (graphics interchange format) file or .jpeg (Joint Photographic Experts Group) format file. Such a file may actually be delivered to the mobile device, or the request may be a request that only serves to log the ad response.

Figure 5:
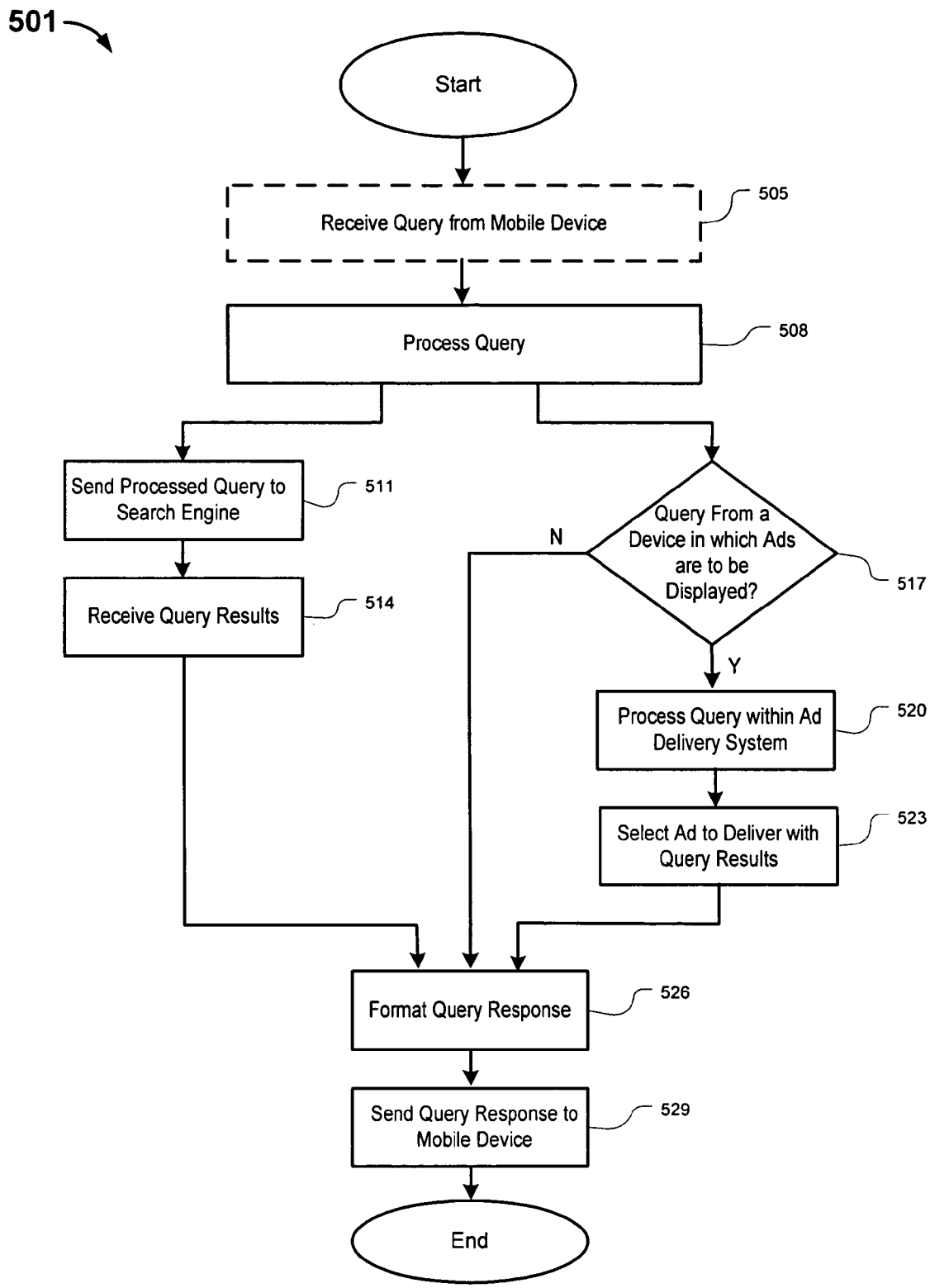
FIG. 5 is a flow diagram of a method for delivering electronic promotional material to a user device, according to some embodiments.

FIG. 5 is a flow diagram of a method 501 for delivering electronic promotional material to a user device. In some embodiments, the method 501 may include receiving (505) a query from a mobile device. For example, an information provider, such as the information provider 101 that is shown in FIG. 1, may receive a search request from a mobile device such the mobile computing device 131.

The method 501 includes processing (508) the query. For example, an interface 201 may receive the search query from the mobile device and may use a request processor 216 to format the search request into a format that can be readily processed by the search engine 204.

The processed query may be sent (511) to a search engine. For example, the request processor 216 may send the processed query to the search engine 204, which may execute a search responsive to the search request. More particularly, the search engine may search the index database 207 to identify content that is responsive to the search request. The search engine 204 may also use the Web crawler 222 to identify other content, outside the information provider 101, that may be responsive to the search request (e.g., content that is stored elsewhere on the central network 104).

The information provider 101 may receive (514) query results. For example, the response formatter 219 may receive (514) search requests from the search engine 204. At the same time that the processed query is sent (511) to the search engine, the processed query may also be sent to the ad delivery system 228. The ad delivery system 228 may determine (517) whether the device from which the search request was received is a device in which ads are to be displayed. If the mobile device is to receive electronic promotional material, the query may be further processed (520) by the ad delivery system 228. More particularly, the ad delivery system 228 may identify a number of ads that relate to the content of the query (e.g., from ads in the ad database 231). From a plurality of ads, the ad delivery system 228 may select (523) one or more ads to actually deliver to the mobile device.

The method 501 may further include formatting (526) a query response by combining the query results that were received (514) and one or more ads that were selected (523) into a response that can be sent to the mobile device. For example, the response formatter 219 may combine (526) search results from the search engine 204 and one or more ads from the ad delivery system 228 into a single HTML message to send to the mobile device. This message may then be sent (529) to the mobile device.

Figure 6:
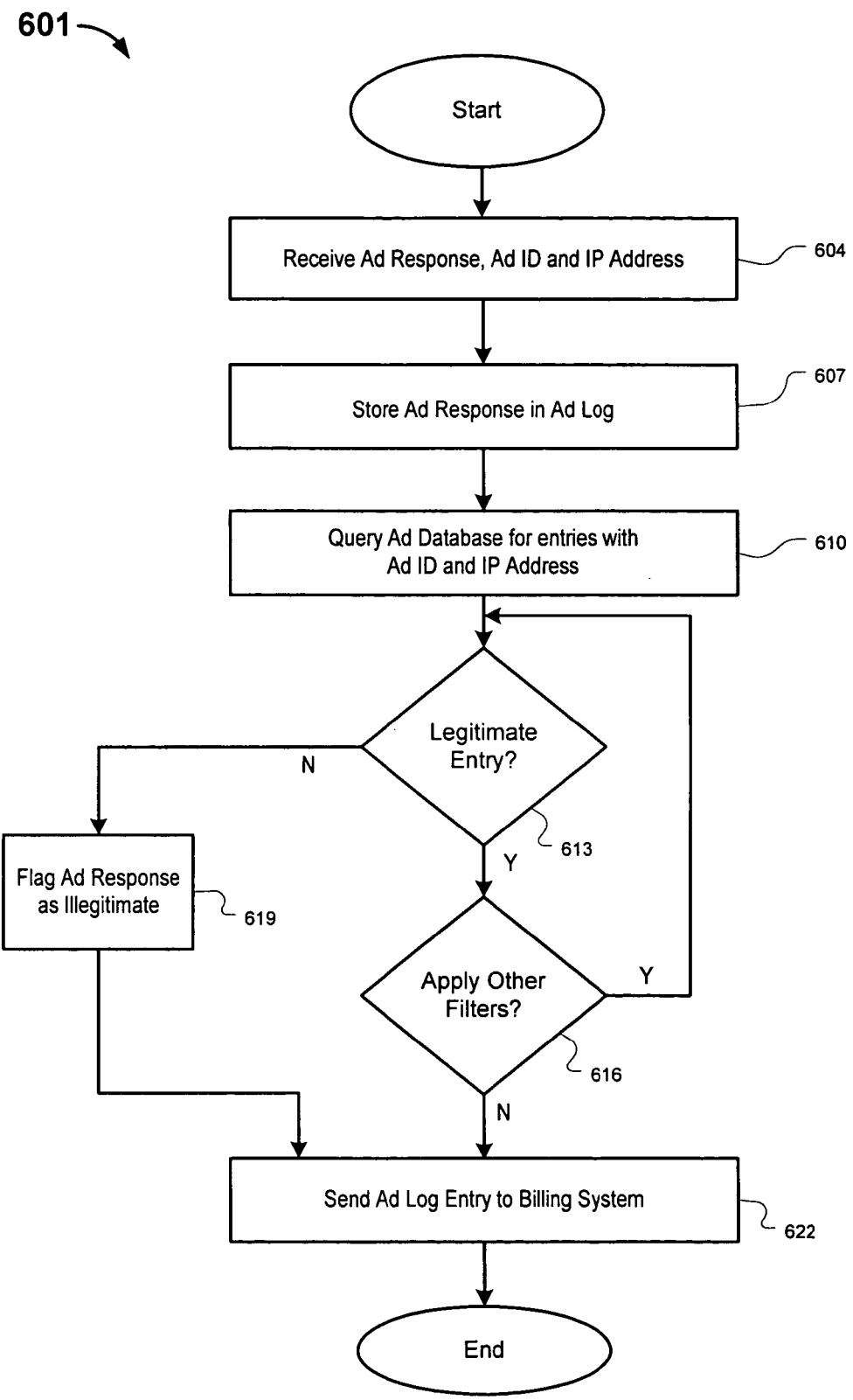
FIG. 6 is an exemplary flow diagram of a method for receiving, logging and filtering ad responses, according to some embodiments.

FIG. 6 is an exemplary flow diagram of a method 601 for receiving, logging and filtering ad responses. The method 601 includes receiving (604) an ad response, an ad ID and an IP address from which the ad response was received. For example, as illustrated with reference FIG. 1, the information provider 101 may receive an ad response from the computing device 134, via path E. Along with the ad response, the information provider 101 may receive an ad ID corresponding to the original ad (e.g., "950909") and an IP address from which the ad was received (e.g., "168.73.240.78"). The method 601 further includes storing (607) the ad response in an ad log. For example, referring to FIG. 2, the information provider 101 may store the ad response in the ad log 234.

An ad database, such as, for example, the ad database 231, may be queried (610) for entries having the ad ID and IP address. For example, the ad delivery system 228 may query (610) the ad database 231 to determine (613) if the ad response is legitimate. Referring to FIG. 3, for example, the ad delivery system 228 may determine whether the IP address associated with the ad response matches an IP address to which the original ad was targeted.

If the IP address does match an IP address to which the original ad was targeted, the ad delivery system 228 may determine that the ad is legitimate, at least relative to one level of filtering, and the ad delivery system may determine (616) whether to apply other filters. Other filters may assess other aspects of ad response legitimacy. As one example, another filter may eliminate duplicate ad responses from a single device. As another example, another filter may identify illegitimate queries that may be sent by a user in order to, for example, fraudulently receive electronic promotional material.

If the IP address from which an ad response is received does not match an IP address to which the original ad was targeted, the ad delivery system 228 may determine that the ad is illegitimate, or spurious, and it may flag (619) the response as such. In some embodiments, flagging (619) a response as illegitimate may cause the ad response to be recorded in a separate database table or report (not shown in the figures), or it may cause the response to be removed from the ad log 231.

After the ad delivery system 228 has processed one or more entries in the ad log 231 to determine (613) whether they are legitimate entries (and has flagged {619} them, if necessary), and has determined (616) that no other filters need to be applied, then the one or more entries may be sent to a billing system. For example, referring to FIG. 3, after the ad delivery system 228 has applied Filter 1, Filter 2 and filter 3 to the ad log 231, the ad delivery system 228 may send entries in the ad log 231 to a billing system 324, which may, for example, bill ad sponsors for delivery of ads or for responses to ads.

The method 601 has been described above as a sequence of operations including storing (607) an ad response, then determining (613) if the response is legitimate. In some embodiments, the ad delivery system may perform these operations in real-time, before entries are stored (607) in a log. More particularly, the method 601 may be modified from what is described above to receive (604) an ad response, ad ID and IP address; query (610) a database with this information to determine (613) if the ad response is legitimate; and then store (607) the response if it is legitimate. Moreover, other filters may also be applied before the ad response is stored (607) in an ad log.

Method 601 was described in the context of processing ad responses, but it may also be applied to process other electronic promotional material, or other information. For example, method 601 could be applied to determine (613) whether initial search queries are legitimate; such a determination may, in some embodiments, protect a system against denial-of-service attacks, or protect ad sponsors from initially delivering ads to unauthorized recipients.

Figure 7:
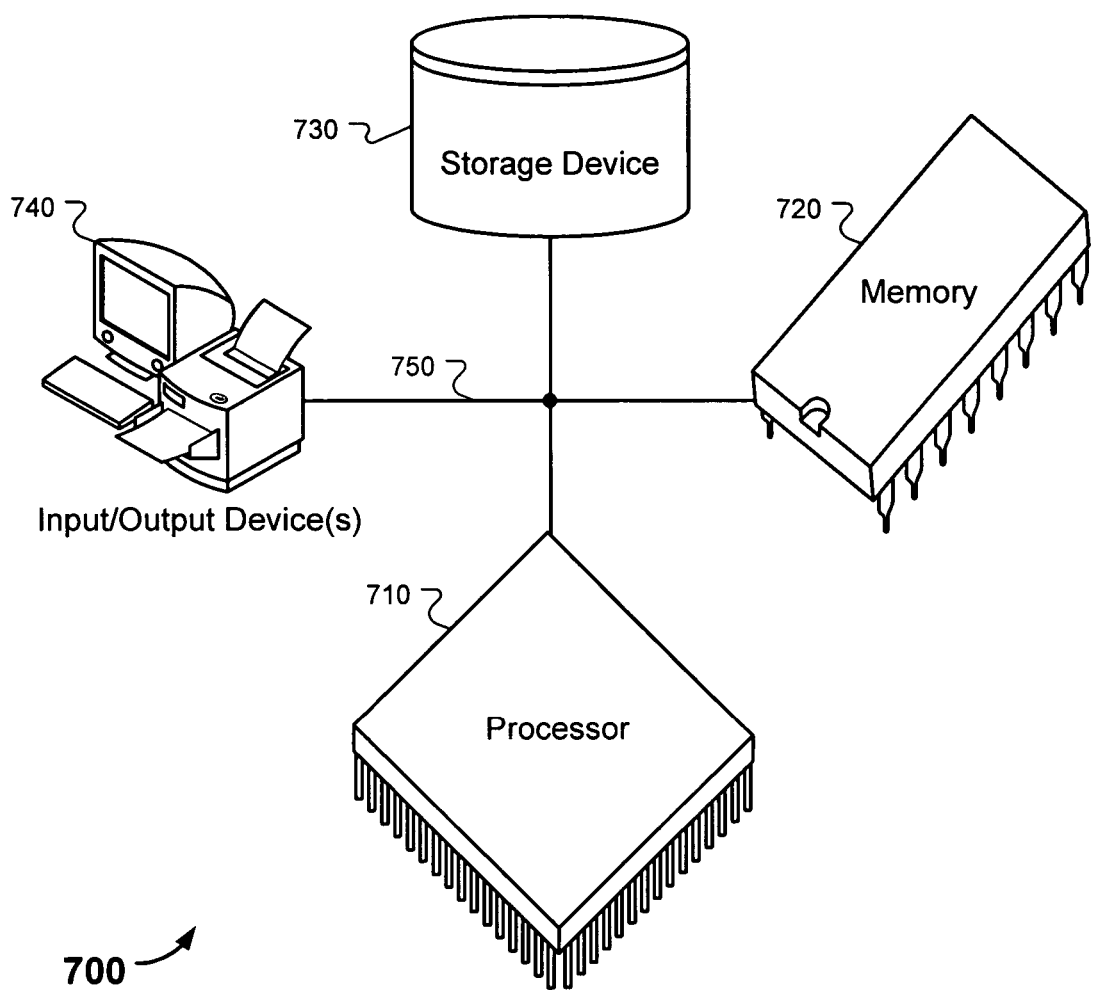
FIG. 7 is a schematic diagram of an exemplary computing system, according to some embodiments.

FIG. 7 is a schematic diagram of an exemplary computing system. The system 700 can be used in the methods 501 and 601 described above, according to one implementation. The system 700 may be included in any or all of the mobile communication devices 122, 125 and 128; the computing devices 131 and 134; and the information provider 101.

The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different embodiments, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described embodiments by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard or keypad and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Embodiments may be implemented, at least in part, in hardware or software or in any combination thereof. Hardware may include, for example, analog, digital or mixed-signal circuitry, including discrete components, integrated circuits (ICs), or application-specific ICs (ASICs). Embodiments may also be implemented, in whole or in part, in software or firmware, which may cooperate with hardware. Processors for executing instructions may retrieve instructions from a data storage medium, such as EPROM, EEPROM, NVRAM, ROM, RAM, a CD-ROM, a HDD, and the like. Computer program products may include storage media that contain program instructions for implementing embodiments described herein.

Although a few embodiments have been described in detail above, other modifications are possible. Portions of this disclosure discuss electronic documents, including HTML, but any number of formats may be processed by the described system, including without limitation, XML, WML, PDF (Portable Document Format), word processing formats, and image formats. Also, the logic flows depicted in the figures do not require the particular order shown, or sequential order, to achieve desirable results. Also, other steps may be provided, or steps may be eliminated, from the described flows, and other components may be added to, or removed from, the described systems. Also, electronic promotional content may include more than just advertisements—such as, donation requests, information, or other content transmitted electronically. Moreover, the systems and methods described in this document may be applied to identify and process spurious requests for information not involving electronic promotional material, such as, for example, queries for information. Accordingly, other embodiments are within the scope of the following claims.

What is claimed is:

1. A computer-implemented method of identifying illegitimate requests for information, comprising:
    identifying a first telecommunications carrier that delivers an electronic promotional item and associating the first telecommunications carrier with the electronic promotional item;
    receiving, at a computer system, an electronic request that relates to the electronic promotional item from a submitter of the request;
    identifying a second telecommunications carrier that carried the request and that corresponds to and is different than the submitter of the request;
    determining with the computer system whether the first telecommunications carrier is different than the second telecommunications carrier;
    identifying the request as illegitimate based on a determination that the first telecommunications carrier is different than the second telecommunications carrier; and
    in response to identifying the request as illegitimate, storing, with the computer system, data indicating an occurrence of the illegitimate request,
    wherein the first and second telecommunications carriers are each organizations that operate telecommunications networks and provide telecommunication services to subscribers or relay services that originate on networks operated by other organizations.

2. The computer-implemented method of claim 1, further comprising transmitting the electronic promotional item to the first carrier.

3. The computer-implemented method of claim 2, wherein the request is a response to the electronic promotional item.

4. The computer-implemented method of claim 1, wherein:
    associating the first telecommunications carrier with the electronic promotional item comprises storing, with the computer system, a list of Internet Protocol (IP) addresses associated with the first telecommunications carrier in a first database, and
    identifying the request as illegitimate comprises determining that an IP address that corresponds to the second telecommunications carrier does not match an address in the list of IP addresses.

5. The computer-implemented method of claim 4, wherein the second carrier is identified by an IP address corresponding to the request.

6. The computer-implemented method of claim 4, further comprising logging the request in a second database.

7. The computer-implemented method of claim 6, further comprising charging an ad sponsor for the request in the second database.

8. The computer-implemented method of claim 7, further comprising preventing a charge for the request if the request is identified as illegitimate.

9. The computer-implemented method of claim 1, wherein the electronic promotional item comprises at least one of a click-to-call link, a redirect link, and a link to more information about the electronic promotional item.

10. A system for identifying spurious requests for information, comprising:
    an interface that receives digital responses to promotional items from users, the digital responses including identifying information for carriers that transmit the responses to the interface; and
    a response filter that determines whether a particular digital response is spurious by comparing identifying information for a carrier to which a particular promotional item was sent to the identifying information for a carrier from which the response was received, wherein a response is determined to be spurious based on identifying that information for the carrier to which the particular promotional item was sent does not match the identifying information for the carrier from which the response was received,
    wherein the carriers are organizations that operate telecommunications networks and provide telecommunication services to subscribers or relay services that originate on networks operated by other organizations.

11. The system of claim 10, wherein the interface comprises an internet web server.

12. The system of claim 10, further comprising a response log, wherein the response filter acts on entries in the response log relating to a plurality of digital responses to promotional items.

13. The system of claim 10, further comprising a promotional item server to select promotional items for delivery to users associated with particular carriers and to provide carrier identifying information with the promotional items.

14. The system of claim 13, further comprising a search engine that receives search requests from the users associated with the particular carriers, wherein the promotional item server further selects promotional items for delivery to said users based on content of the search requests.

15. The system of claim 10, wherein the carrier identifying information comprises an Internet Protocol (IP) address.

16. The system of claim 10, wherein the digital responses further include identifying information for a corresponding promotional item.

17. The system of claim 10, further comprising a billing system that charges a sponsor of a promotional item for responses to the promotional item that are not identified as spurious.

18. A system for identifying illegitimate requests for information, comprising:
    an interface that receives digital responses to promotional items from users, the digital responses including identifying information for carriers that carry the responses; and
    means for determining responses to be illegitimate based on a determination that the carrier-identifying information associated with the responses does not match carrier-identifying information associated with the promotional items, wherein the carriers are organizations that operate telecommunications networks and provide telecommunication services to subscribers or relay services that originate on networks operated by other organizations.

19. The system of claim 18, further comprising a promotional item server to select promotional items for delivery to users associated with the carriers and to provide carrier-identifying information with the promotional items.

20. The system of claim 19, further comprising a billing system that charges a sponsor of a promotional item for digital responses to the promotional item that are not identified as spurious.

* * * * *